United States Patent [19]
Yoshikawa

[11] Patent Number: 5,892,350
[45] Date of Patent: Apr. 6, 1999

[54] BATTERY OPERATED SELF MOVING MOBILE OBJECT AND CHARGING SYSTEM

[75] Inventor: Hideyuki Yoshikawa, Tokyo, Japan

[73] Assignee: Sega Enterprises, Ltd., Tokyo, Japan

[21] Appl. No.: 614,554

[22] Filed: Mar. 13, 1996

[51] Int. Cl.[6] .................................................. H02J 7/00
[52] U.S. Cl. .......................................... 320/107; 446/454
[58] Field of Search ............................... 320/2, 107, 109, 320/DIG. 34; 414/281–282; 446/454, 269, 431

[56] References Cited

U.S. PATENT DOCUMENTS

| 4,983,903 | 1/1991 | Bae et al. | 320/2 |
| 5,461,298 | 10/1995 | Lara et al. | 320/2 |
| 5,545,967 | 8/1996 | Osborne et al. | 320/2 |

FOREIGN PATENT DOCUMENTS

| 07068056A | 3/1995 | Japan | 320/2 |

Primary Examiner—Stuart N. Hecker
Assistant Examiner—Gregory J Toatley, Jr.
Attorney, Agent, or Firm—Dickstein Shapiro Morin & Oshinsky, LLP

[57] ABSTRACT

A mobile object self-moving system self-moves mobile objects 14 in a set field. The system comprises charging means 32 for charging batteries 52 of the mobile objects 14 is disposed at a set charging position in the field plate 12, position detecting means 24, 25 for detecting positions of the mobile objects 14 in the field plate 12, and moving course storing means 26 for storing moving courses which are routed via the charging position every a prescribed period of time. Movement control means 28 controls the mobile objects 14 to move along the moving courses, based on positions of the mobile objects 14 detected by the position detecting means 24, 25. The mobile objects 14 are positioned at the charging position 16 every the prescribed period of time to have the batteries thereof charged by the charging means 32. The system is easy to maintain for adjustment, repairs, etc., and can be produced at low costs.

11 Claims, 5 Drawing Sheets

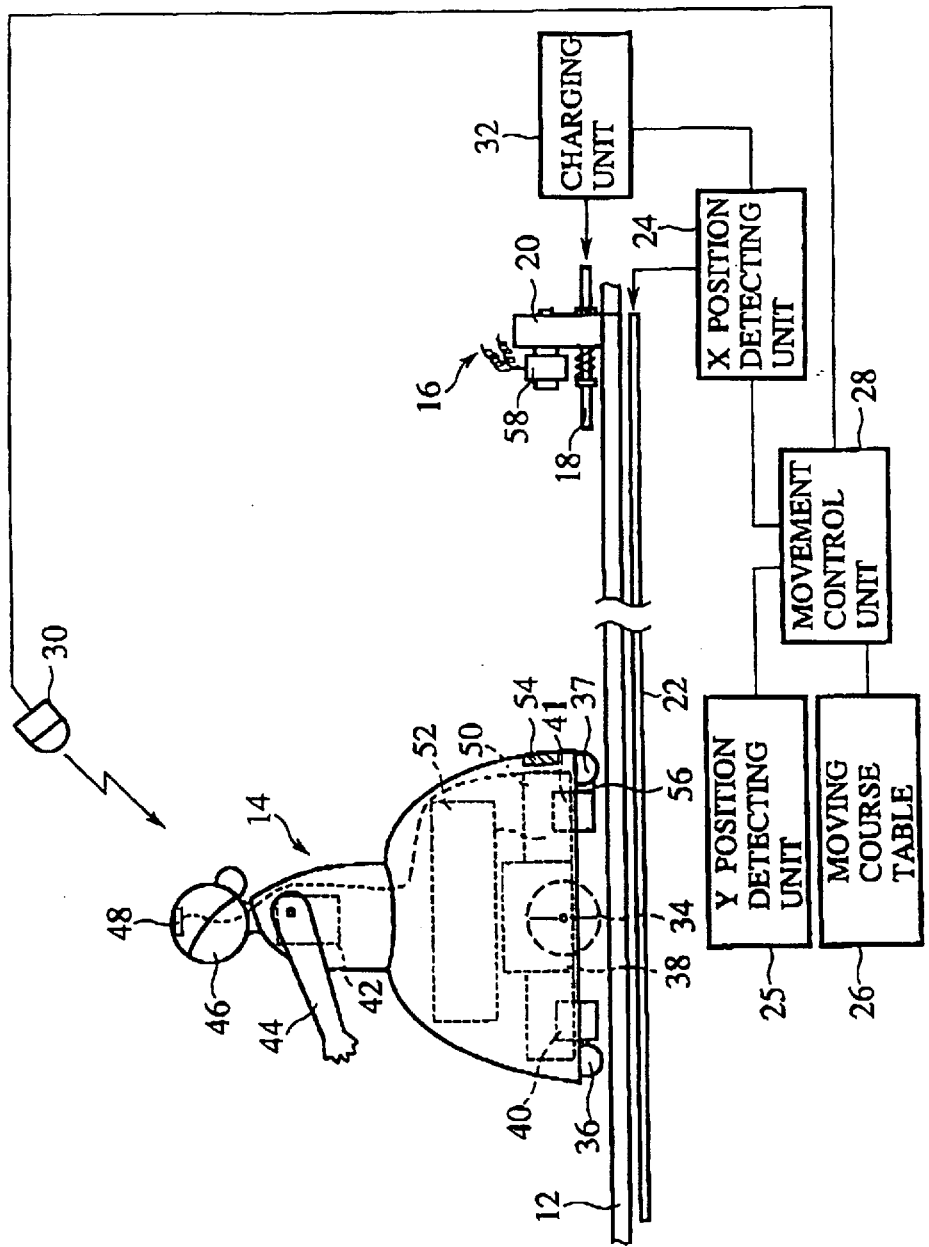

BATTERY OPERATED SELF MOVING MOBILE OBJECT AND CHARGING SYSTEM

BACKGROUND OF THE INVENTION

The present invention relates to a mobile object self-moving system for moving mobile objects by themselves in a set field.

A conventionally known mobile object self-moving system for moving mobile objects by themselves in a set field is described in Japanese Patent Laid-Open Publication No. Tokkaihei 01-259404/1989.

In the mobile car self-moving system described in the above-described publication, coordinate values of at least two positions of respective mobile cars are read, directions for the mobile cars to move in and speeds for the mobile cars to move at are computed based on the read coordinate values of the at least two positions of the respective mobile cars, and coordinate values of target coordinate values, and driving amounts of drive means for the respective mobile cars are computed based on the directions and the speeds, and the drive means are driven by the computed driving amounts to self-move the mobile cars. Thus the conventional system enables the mobile cars to freely drive along free drive lines.

However, in the conventional mobile object self-moving system, a run plate is provided below a floor plate with run courses provided thereon independent thereof, self-moving cars for moving model cars, etc. on the run courses are provided on the run plate, and running of the self-moving cars is controlled to cause the model cars on the run courses to move following the self-moving cars by magnets. Thus the conventional mobile object self-moving system has a complicated structure which includes the floor plate, and the run plate which is provided independent of the floor plate. As a result, this adds to costs, and the floor plate must be detached for every adjustment and maintenance, which makes maintenance bothersome. These are disadvantages of the conventional mobile object self-moving system.

In the conventional mobile object self-moving system, electric power for driving mobile objects is supplied by the run plate through contacts. Contact between the contacts and the run plate tends to be unstable, and maintenance for ensuring stable power supply is bothersome. This is a disadvantage.

SUMMARY OF THE INVENTION

An object of the present invention is to provide a mobile object self-moving system which is easy to maintain for adjustments, repairs, etc., and whose production cost can be low.

The above-described object is achieved by a mobile object self-moving system comprising: mobile objects including batteries which can be charged; a field on which the mobile objects move; charging means which is disposed at set charging positions on the field and which charges the batteries of the mobile objects; and movement control means which controls movement of the mobile objects so that the mobile objects are positioned at the charging positions to have the batteries thereof charged.

The above-described object is achieved by a mobile object self-moving system comprising: mobile objects including batteries which can be charged; a field on which the mobile objects move; charging means which is disposed at set charging positions on the field and which charges the batteries of the mobile objects; movement control means which controls movement of the mobile objects so that the mobile objects are positioned at the charging positions to have the batteries thereof charged; position detecting means which detects positions of the mobile objects in the field; and moving course storing means which stores moving courses which are routed via the charging positions, the movement control means controlling the mobile objects to move along the moving courses, based on positions of the mobile objects detected by the position detecting means.

The above-described object is achieved by a mobile object self-moving system comprising: mobile objects including batteries which can be charged; a field on which the mobile objects move; charging means which is disposed at set charging positions in the field and charges the batteries of the mobile objects; and movement control means which controls movement of the mobile objects so that the mobile objects are positioned at the charging positions to have the batteries thereof charged; charged current detecting means for detecting current charged by the charging means; and contact confirming means for confirming contact between the batteries and the charging means, based on the detected current detected by the charged current detecting means, the movement control means finely adjusting positions of the mobile objects until the contact is detected by the contact confirming means, when the mobile objects are positioned at the charging position.

The above-described object is achieved by a mobile object self-moving system comprising: mobile objects including batteries which can be charged; a field on which the mobile objects move; charging means which is disposed at set charging positions on the field and which charges the batteries of the mobile objects; and movement control means which controls movement of the mobile objects so that the mobile objects are positioned at the charging positions to have the batteries thereof charged; and securing means for securing the mobile objects to the charging positions on charging.

The above-described object is achieved by a mobile object self-moving system comprising: mobile objects including batteries which can be charged; a field on which the mobile objects move; charging means which is disposed at set charging positions on the field and which charges the batteries of the mobile objects; charged current detecting means for detecting current charged by the charging means; contact confirming means for confirming contact between the batteries and the charging means, based on the charged current detected by the charged current detecting means; movement control means for controlling movement of the mobile objects so that the mobile objects are positioned at the charging positions to charge the batteries thereof by the charging means; position detecting means for detecting positions of the mobile objects on the field; and moving course storing means for storing moving courses which are routed via the charging position, the movement control means controlling the mobile objects to move along the moving courses, based on positions of the mobile objects detected by the position detecting means, the movement control means finely adjusting positions of the mobile objects until the contact is detected by the contact confirming means, when the mobile objects are positioned at the charging position.

In the above-described mobile object self-moving system, it is preferable that the movement control means controls movement of the mobile objects so that the mobile objects are positioned at the charging positions every a prescribed period of time.

According to the present invention, the mobile object self-moving system comprises mobile objects including batteries which can be charged, a field on which the mobile objects can move, charging means disposed at a set position on the field and charging the batteries of the mobile objects, and movement control means for controlling movement of the mobile objects, whereby the mobile objects are positioned at the charging position every a prescribed to have the batteries thereof charged by the charging means. As a result, the batteries can ensure stable electric power supply; maintenance, as of adjustment, repairs, etc., are facilitated; and production costs can be low.

BRIEF DESCRIPTION OF THE DRAWINGS

FIG. 3 is a view of the mobile object self-moving system according to the embodiment of the present invention, which schematically explains the system according to the embodiment.

DETAILED DESCRIPTION OF THE INVENTION

The mobile object self-moving system according to one embodiment of the present invention will be explained with reference to FIGS. 1 to 4B. The mobile object self-moving system according to the present invention is applied to a mechanized clock in which mobile objects in the form of dolls, etc. play at every exact hour.

Figure 1:
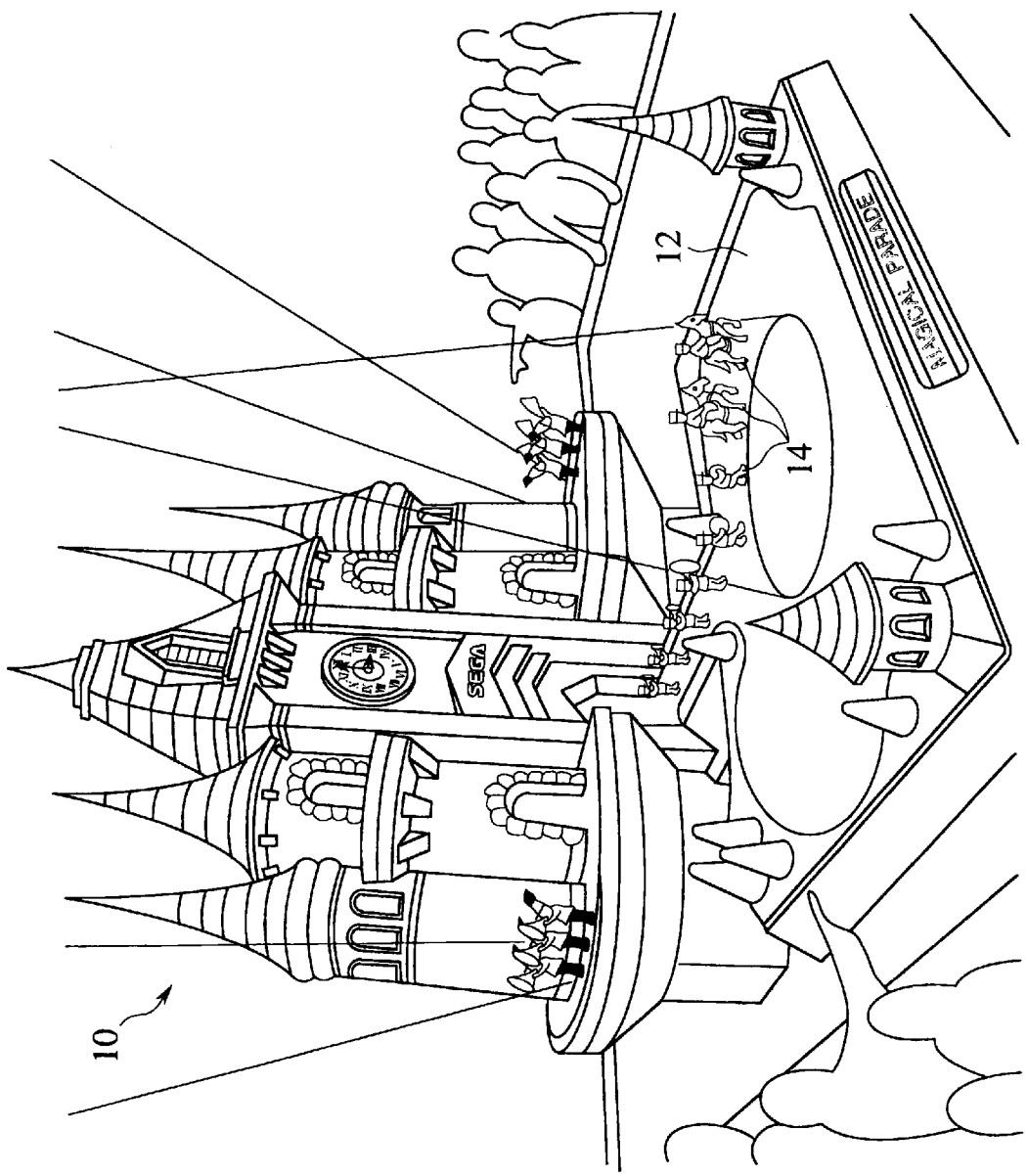
FIG. 1 is a perspective view of the mobile object self-moving system according to an embodiment of the present invention, which shows an appearance thereof.

In the mobile object self-moving system according to the present embodiment, as shown in FIG. 1, mobile objects 14 in the form of horses, dolls, etc. freely move on a part of a field plate 12 which is in the form of a garden of a palace 10. Spectators can enjoy seeing the mobile objects 14, as the horses, dolls, etc., freely moving.

Figure 2:
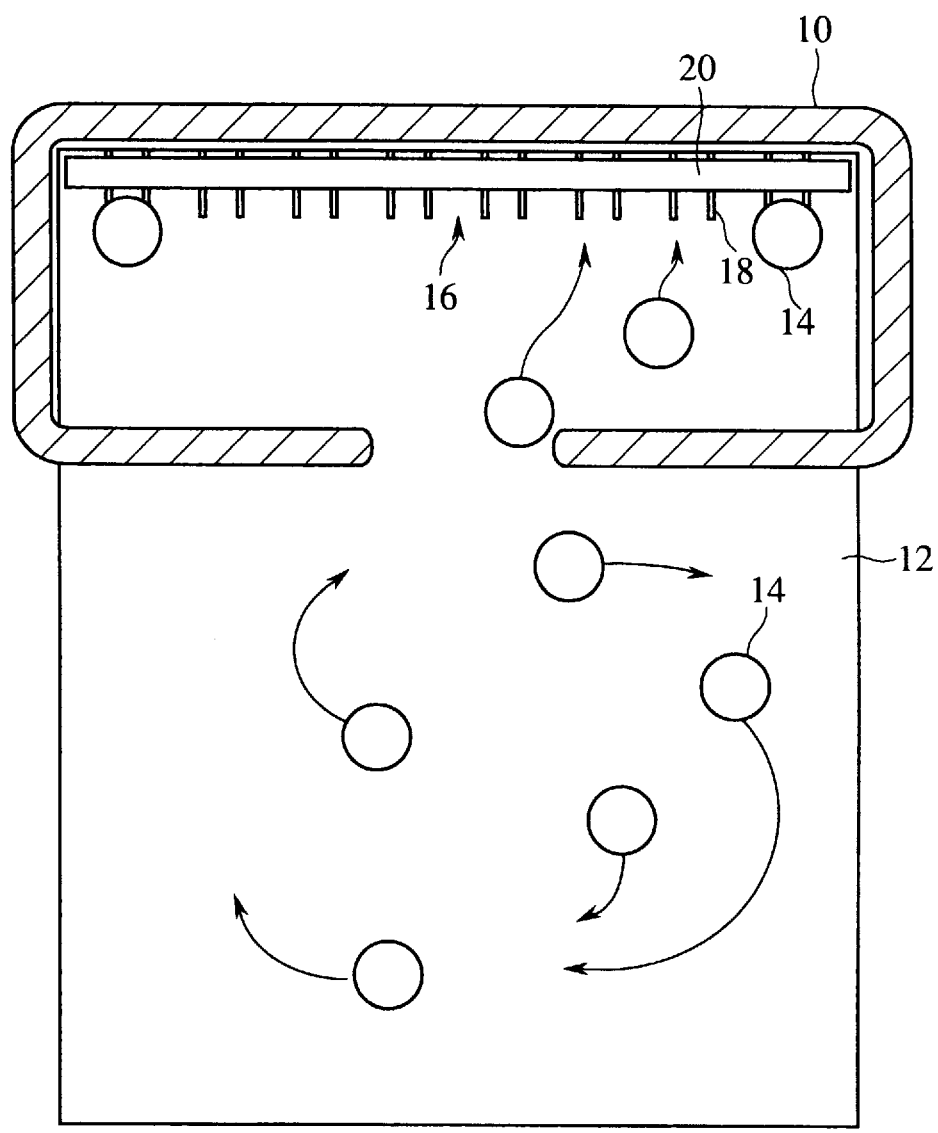
FIG. 2 is a schematic plan view of the mobile object self-moving system according to the embodiment of the present invention.

As shown in FIG. 2, a charging station 16 for charging the mobile objects 14 is provided on a part of the field plate 12 corresponding to the palace 10. A plurality of pairs of stationary electrodes 18 for charging are disposed in the charging station 16, and the stationary electrodes 18 are supported on a support plate 20.

The mobile objects 14, as of horses, dolls, etc., rest at the charging station 16 in the palace 10 when they do not play. At every exact hour, the mobile objects 14, as of horses, dolls, etc., come out of the palace 10 to play on the field plate 12, and when the play is over, the mobile objects go back into the palace 10 to be connected to the respective stationary electrodes 18 in the charging station 16 and to be charged for the next play.

The mobile object self-moving system according to the present embodiment will be detailed with reference to FIG. 3, and FIGS. 4A and 4B.

As shown in FIG. 3, below the field plate 12 on which the mobile objects 14 move, there is provided a position detecting plate 22 with lines printed in a matrix. An X position detecting unit 24 and a Y position detecting unit 25 are connected to the position detecting plate 22.

The X position detecting unit 24 detects a coordinate position in the X-direction of each of the mobile objects 14, based on induced currents induced in the lines of the position detecting plate 22 by oscillation of coils of the mobile objects 14. The Y position detecting unit 25 detects a coordinate position in the Y-direction of each of the mobile objects 14, based on induced currents induced in lines of the position detecting plate 22 by oscillation of coils of the mobile objects 14.

Moving courses for the respective mobile objects 14 are stored in a moving course table 26. A movement control unit 28 computes moving directions and moving speeds for the mobile objects 14, based on current positions of the mobile objects 14 detected by the X position detecting unit 24 and the Y position detecting unit 25, and moving courses for the mobile objects 14 stored in the moving course table 26, and outputs drive control instructions which are based on computed results, as photo-signals by infrared emitting diodes 30.

A charging unit 32 for charging the mobile objects 14 is provided for the stationary electrodes 18. The charging unit 32 charges the mobile objects 14 and also detects connections of the mobile objects 14 to the stationary electrodes 18 and completion of charging of the mobile objects 14.

The mobile objects 14 will be explained with reference to FIGS. 4A and 4B,

On the underside of each mobile object 14, drive wheels 34, 35 are disposed on the left and the right sides thereof, and support balls 36, 37 are disposed on the leading and the trailing sides. The drive wheels 34, 35 each include geared motors 38, 39. The drive wheels 34, 35 are driven by the geared motors 38, 39 to smoothly move on the support balls 36, 37 left and right, and to-and-fro.

The coils 40, 41 for position detection are disposed respectively inner of the support balls 36, 37. The coils 40, 41 are periodically oscillated in advance at a prescribed frequency. A current is induced in the lines directly below the coils 40, 41, and positions of the mobile objects 14 are detected by the X position detecting unit 24 and the Y position detecting unit 25.

A motor 42 is disposed at an upper part inside the mobile object 14. The arms 44 and the head 46 of the mobile object 14 are moved by the motor 42.

A photo-detecting device 48 for detecting photo-signals of the infrared emitting diode 30 is provided on the top of the head 46.

A control circuit 50 for the central control is provided inside the mobile object 14. To the control circuit 50 are connected the photo-detecting device 48, the geared motors 38, 39, and the motor 42. The control circuit 50 controls drives of the geared motors 38, 39, and the motor 42, based on drive control instructions in the form of photo-signals detected by the photo-detecting device 48.

A rechargeable battery 52 is provided above the geared motors 38, 39 as an electric power source of the mobile object 14.

An iron piece 54 is exposed on the center of the back of the mobile object 14. Charging electrodes 56, 57 for charging are disposed on the left and the right sides of the iron piece 54. The battery 52 is connected to the charging electrodes 56, 57.

Figure 4A:
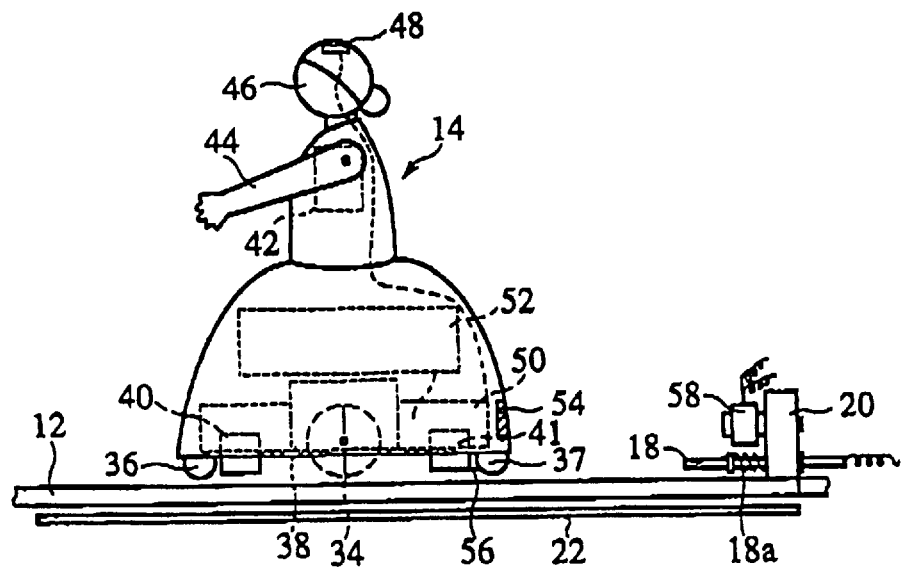
FIGS. 4A and 4B are explanatory views which detail major parts of the mobile object self-moving system according to the embodiment.
Figure 4B:
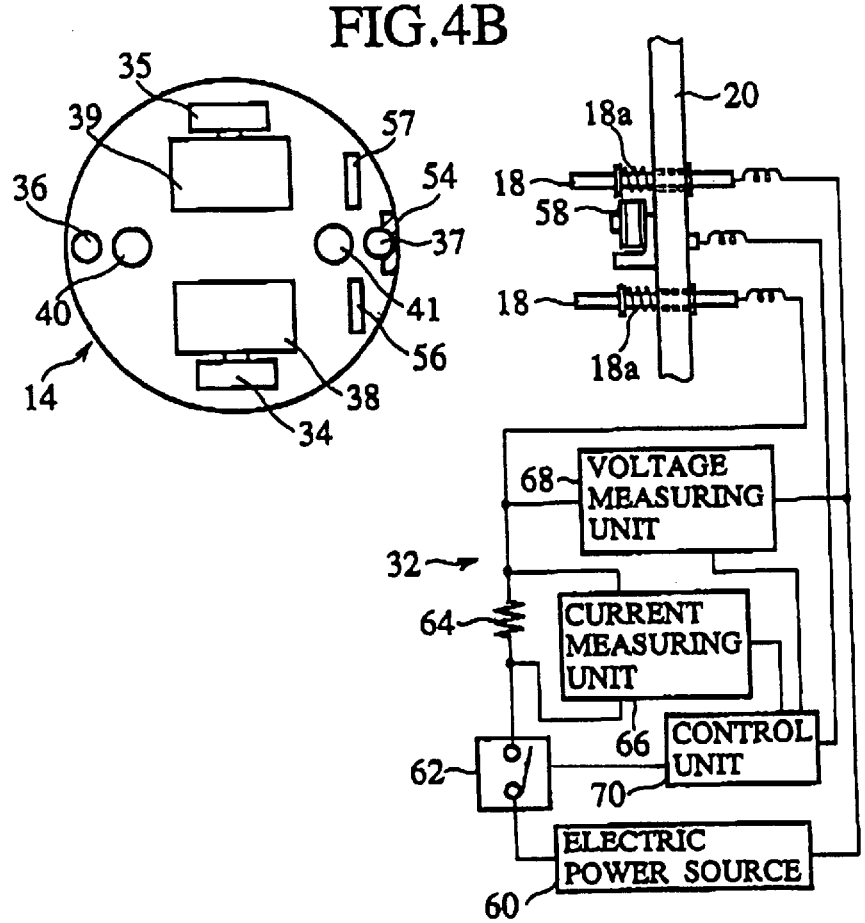

With reference to FIGS. 4A and 4B, a structure of the charging unit 32 and its vicinity will be detailed.

As shown in FIG. 4B, pairs of coil springs 18a are disposed around the stationary electrodes 18 fixed to the support plate 20. Electromagnets 58 for fixing the mobile objects 14 are attached to the support plate 20 between the stationary electrodes of the respective pairs.

Electric power sources 60 for the charge are provided in the charging unit 32, and both terminals of each electric power source 60 are connected respectively to the stationary electrodes of each pair of coil springs 18a. An ON/OFF switch 62 is serially connected to one of the terminals of the electric power source 60. A resistor 64 for measuring current is serially connected to the ON/OFF switch 62. A current measuring unit 66 is connected to both ends of the resistor 64. Both terminals of the electric power source 60 are parallelly connected to a voltage measuring unit 68 which measures voltages.

A control unit 70 controls on/off switching of the ON/OFF switch 62. The control unit 70 close the ON/OFF switch 62, based on an external on/off control signal to start the charge and opens the ON/OFF switch 62 based on measured values given by the current measuring unit 66 and the voltage measuring unit 68 to end the charge.

Then, the operation of the mobile object self-moving system according to the present embodiment will be explained.

Moving courses of the respective mobile object 14 are set in advance and stored in the moving course table 26. The moving course are set in accordance with their roles so that their movements bring about a merry atmosphere. The respective moving courses are so set that the mobile objects 14 come back to the charging station at a prescribed time interval.

The mobile objects 14 are initially located at the charging station 16, and the electromagnets 58 are charged to attract the mobile objects 14. The batteries 52 in the mobile objects 14 are charged by the charging unit 32.

At every exact hour the charge to the electromagnets 58 is stopped, and the mobile objects 14 are released from attraction to the charging station 16. Then, the mobile objects 14 are controlled to move along their moving courses stored in the moving course table 26.

The movement control unit 28 computes drive control instructions for moving the mobile objects 14 along the prescribed moving courses, based on current positions of the mobile objects 14 detected by the X position detecting unit 24 and the Y position detecting unit 25, and the instructions are supplied to the mobile objects 14 as photo-signals from the infrared emitting diodes 30.

The photo-detecting device 48 disposed on the heads 46 of the mobile objects 14 detects photo-signals, and the geared motors 38, 39 and the motors 42 are driven in accordance with drive control instructions. The mobile objects 14 come out of the palace 10 along the moving courses and moves the arms 44 and the heads 46 to play.

When the play is over, the mobile objects 14 go back into the palace 10 along the moving courses and to the charging station 16.

The mobile objects 14 go back to their own stationary electrodes 18 in the charging station 16 and the stationary electrodes 18 in the charging station 16 are connected to the electrodes 56, 57. At this time the electromagnets 58 have been charged to attract the iron pieces 54 to retain the mobile objects 14.

Next, the ON/OFF switch 62 is closed to start charging the batteries 52 of the mobile objects 14 by the electric power source 60.

In a case that even when the ON/OFF switch 62 is closed, no charge current is detected by the current detecting unit 66, the movement control unit 28 moves the mobile objects back and forth for fine adjustment so as to correctly connect the electrodes 56, 57 of the mobile objects 14 to the stationary electrodes 18. Moving courses for the fine adjustment are in advance stored in the moving course table 26.

When the charge current is detected by the current detecting unit 66, and the charge to the batteries 62 is correctly started, the current detecting unit 66 and the voltage detecting unit 68 monitor charging states. When a voltage detected by the voltage detecting unit 68 is above a prescribed voltage, and a charge current detected by the current detecting unit 66 is below a prescribed current, the control unit 70 judges the charge is over and opens the ON/OFF switch 62. The charge is thus automatically completed to thereby prevent overcharge of the batteries 52.

At every exact hour the above-described operation is repeated to cause the mobile objects 14 to play.

Thus the present embodiment has a simple structure in which the mobile objects are moved directly on the field plate. The simple structure makes it possible to produce the system at low costs. The system can be adjusted or repaired simply without removing the field plate. This facilitates the maintenance.

Figure 5:
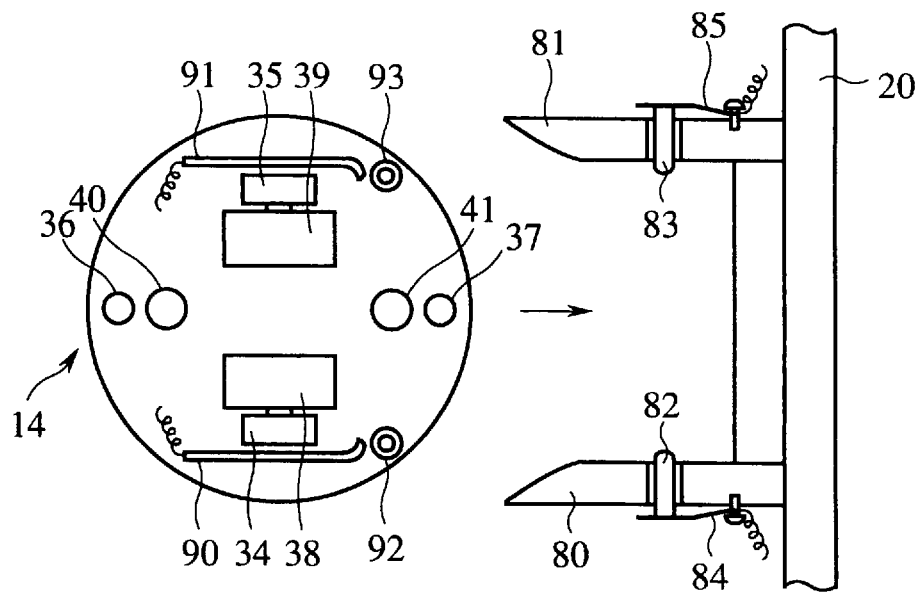
FIG. 5 is a view which details a structure of a charging unit and its vicinity of the mobile object self-moving system according to another embodiment of the present invention.

A structure of a charging unit and its vicinity of the mobile object self-moving system according to another embodiment of the present invention will be detailed with reference to FIG. 5. Members of the present embodiment common with the mobile object self-moving system of FIGS. 1 to 4B are represented by common reference numerals so as not to repeat or to simplify their explanation.

In the present embodiment, the batteries 52 are charged without fixing the mobile objects 14 at their charging positions.

Two arms members 80, 81 are mounted on a support plate 20 of a charging station 16. Electrode brushes 82, 83 for charging are respectively provided on the arm members 80, 81 and are urged inward by spring members 84, 85. The electrode brushes 82, 83 are connected to a charging unit 32 as in FIG. 4B.

Current collector plates 90, 91 are disposed on the underside of each mobile object 14 outer of left and right drive wheels 34, 35. The electrode brushes 82, 83 contact the current collector plates 90, 91 to supply charging current to the mobile object 14. Guide wheels 92, 93 are disposed respectively behind the current collector plates 90, 91.

When the mobile object 14 is charged, the mobile object 14 goes back to the charging station 16 and between the arms members 80, 81. The mobile object 14 is guided by the guide wheels 92, 93 to bring the current collector plates 90, 91 into contact with the electrode brushes 82, 83 mounted on the arms members 80, 81. When the electrode brushes 82, 83 contact the current collector plates 90, 91 of the mobile object 14, an electric power source 60 outputs current to charge the battery 52 of the mobile object 14.

Thus, according to the present embodiment, the mobile objects can be charged by the simple constitution without fixing the mobile objects at the charging station.

Figure 6:
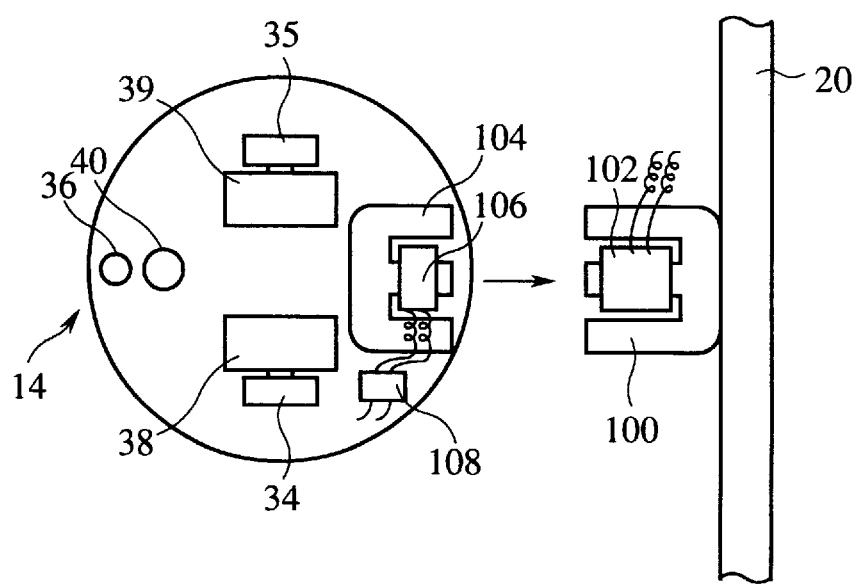
FIG. 6 is a view which details a structure of a charging unit and its vicinity of the mobile object self-moving system according to another embodiment of the present invention.

Next, a structure of a charging unit and its vicinity of the mobile object self-moving system according to further another embodiment of the present invention will be detailed with reference to FIG. 6. Members of the present embodiment common with the mobile object self-moving system of FIGS. 1 to 4B are represented by common reference numerals so as not to repeat or to simplify their explanation.

In the present embodiment as well, batteries of mobile objects 14 are charged without fixing the mobile objects at charging positions.

An iron core 100 is secured to a support plate 20 of a charging station 16, and a coil 102 is wound on the iron core 100. Upon charging, alternating current is supplied to the coil 102.

An E-shaped iron core 104 of sectional surface which is identical with that of the iron core 100 of the charging station 16 is disposed on the backside of each mobile object 14 at a backward position. A coil 106 is wound on the iron core 104. The coil 106 is connected to a rectifying circuit 108.

Upon charging, the mobile object 14 goes back to the charging station 16 with the iron core 104 of the mobile object 14 coming nearer to the iron core 100 of the charging station 16. The neighboring iron cores 100; 104 form a closed magnetic path and form a transformer having the coil 102 as the primary coil and the coil 106 as a secondary coil.

When AC voltage is applied to the coil 102, AC voltage is generated in the coil 106. The AC voltage generated in the coil 106 is rectified by the rectifying circuit 108 to DC voltage, and the battery 52 is charged with the DC voltage.

Thus, according to the present embodiment, the mobile objects can be incontiguously charged at the charging station.

The present invention is not limited to the above-described embodiments and covers other modifications and variations.

In the above-described embodiments, the mobile objects are moved by two drive wheels, but as long as the mobile objects can be moved, being controlled in speed and direction, the driving means is not limited to that of the above-described embodiments and can be any such means.

Positions of the mobile objects are detected at two locations but may be detected at three or more locations.

The position detecting method is not limited to the electromagnetic inducing method used in the above-described embodiments but may be an electrostatic inducing method, supersonic method, or others.

The mobile objects may be charged by a charging method other than that used in the above-described embodiments.

The present invention is applied to mechanical clocks in the above-described embodiments but, needless to say, it is applicable to other play machines, or to robots which are not toys but are used in factories, etc.

What is claimed is:

1. A mobile object self-moving system comprising:
mobile objects including batteries which can be charged;
a field on which the mobile objects move;
charging means which is disposed at set charging positions on the field and which charges the batteries of the mobile objects; and
movement control means which controls movement of the mobile objects so that the mobile objects are positioned at the charging positions to have the batteries thereof charged, the batteries remaining onboard mobile object during charging.

2. A mobile object self-moving system comprising:
mobile objects including batteries which can be charged;
a field on which the mobile objects move;
charging means which is disposed at set charging positions on the field and which charges the batteries of the mobile objects;
movement control means which controls movement of the mobile objects so that the mobile objects are positioned at the charging positions to have the batteries thereof charged;
position detecting means which detects positions of the mobile objects in the field; and
moving course storing means which stores moving courses which are routed via the charging positions,
the movement control means controlling the mobile objects to move along the moving courses, based on positions of the mobile objects detected by the position detecting means.

3. A mobile object self-moving system according to claim 2, wherein
the movement control means controls movement of the mobile objects so that the mobile objects are positioned at the charging positions every prescribed period of time.

4. A mobile object self-moving system according to claim 2, wherein
the movement control means controls movement of the mobile objects so that the mobile objects are positioned at the charging position every a prescribed period of time.

5. A mobile object self-moving system comprising:
mobile objects including batteries which can be charged;
a field on which the mobile objects move;
charging means which is disposed at set charging positions in the field and charges the batteries of the mobile objects; and
movement control means which controls movement of the mobile objects so that the mobile objects are positioned at the charging positions to have the batteries thereof charged, the batteries being on board the mobile object during charging;
charging current detecting means for detecting a charging current from the charging means; and
contact confirming means for confirming contact between the batteries and the charging means, based on the detected current detected by the charging current detecting means,
the movement control means finely adjusting positions of the mobile objects until the contact is detected by the contact confirming means, when the mobile objects are positioned at the charging position.

6. A mobile object self-moving system according to claim 5, wherein
the movement control means controls movement of the mobile objects so that the mobile objects are positioned at the charging positions every prescribed period of time.

7. A mobile object self-moving system comprising:
mobile objects including batteries which can be charged;
a field on which the mobile objects move;
charging means which is disposed at set charging positions on the field and which charges the batteries of the mobile objects; and
movement control means which controls movement of the mobile objects so that the mobile objects are positioned at the charging positions to have the batteries thereof charged; and
securing means for securing the mobile objects to the charging positions on charging.

8. A mobile object self-moving system according to claim 7, wherein
the movement control means controls movement of the mobile objects so that the mobile objects are positioned at the charging positions every prescribed period of time.

9. A mobile object self-moving system comprising:

mobile objects including batteries which can be charged;

a field on which the mobile objects move;

charging means which is disposed at set charging positions on the field and which charges the batteries of the mobile objects;

charged current detecting means for detecting current charged by the charging means;

contact confirming means for confirming contact between the batteries and the charging means, based on the charged current detected by the charged current detecting means;

movement control means for controlling movement of the mobile objects so that the mobile objects are positioned at the charging positions to charge the batteries thereof by the charging means;

position detecting means for detecting positions of the mobile objects on the field; and moving course storing means for storing moving courses which are routed via the charging position, the movement control means controlling the mobile objects to move along the moving courses, based on positions of the mobile objects detected by the position detecting means, the movement control means finely adjusting positions of the mobile objects until the contact is detected by the contact confirming means, when the mobile objects are positioned at the charging position.

10. A mobile object self-moving system according to claim 9, wherein the movement control means controls movement of the mobile objects so that the mobile objects are positioned at the charging positions every a prescribed period of time.

11. A mobile object self-moving system comprising:

a mobile object including at least one battery which can be charged;

a field on which the mobile object moves;

a charger disposed in the field, the charger including electrodes for charging the at least one battery of the mobile object; and a movement controller which controls movement of the mobile object so that the mobile object is positioned at the charging position to have the batteries thereof charged; the batteries being onboard the mobile objects during charging a charging current detecting unit electrically coupled to the charger for detecting a charging current from the charger; and contact confirming means for confirming contact between the batteries and the charging means, based on the detected current detected by the charging current detecting unit;

the movement controller finely adjusting positions of the mobile object until the contact in detected by the contact confirming means, when the mobile objects are positioned at the charging position.

* * * * *